United States Patent [19]

Schindler

[11] Patent Number: 4,895,655
[45] Date of Patent: Jan. 23, 1990

[54] FILTRATION APPARATUS

[75] Inventor: Robert H. Schindler, Bellmund, Switzerland

[73] Assignee: Liquitech Holding S.A., Luxembourg, Luxembourg

[21] Appl. No.: 183,583

[22] Filed: Apr. 19, 1988

[30] Foreign Application Priority Data

Apr. 27, 1987 [LU] Luxembourg .............................. 86857

[51] Int. Cl.[4] ............................................. B01D 29/38
[52] U.S. Cl. ..................................... 210/411; 210/423
[58] Field of Search ................ 210/108, 333.01, 333.1, 210/371, 393, 411, 419, 422, 423, 425, 426, 427, 456

[56] References Cited

U.S. PATENT DOCUMENTS

| | | | |
|---|---|---|---|
| 3,513,981 | 5/1970 | Mendelow | 210/425 |
| 3,828,932 | 8/1974 | Schneer | 210/411 |
| 4,046,692 | 9/1977 | Braukmann et al. | 210/411 |

Primary Examiner—Ivars Cintins
Attorney, Agent, or Firm—Thomas S. Baker, Jr.

[57] ABSTRACT

The invention concerns a filtration apparatus comprising a vessel divided into two chambers by a filter. An inlet orifice is provided in the vessel for liquid to be filtered, as well as an outlet orifice for the filtered liquid. A distributor device movable from the exterior of the vessel between a filtration position and a rinsing position is arranged in the vessel. In the filtration position of the distributor liquid is filtered into the first chamber, which the liquid leaves by passing through the filter, to penetrate into the second chamber, which it leaves, in the filtered condition, through the outlet orifice. In the rinsing position the liquid flows directly into the second chamber and passes through the filter in the reverse direction to penetrate into the first chamber which it leaves charged with impurities to be eliminated by an escape orifice arranged in the vessel.

1 Claim, 3 Drawing Sheets

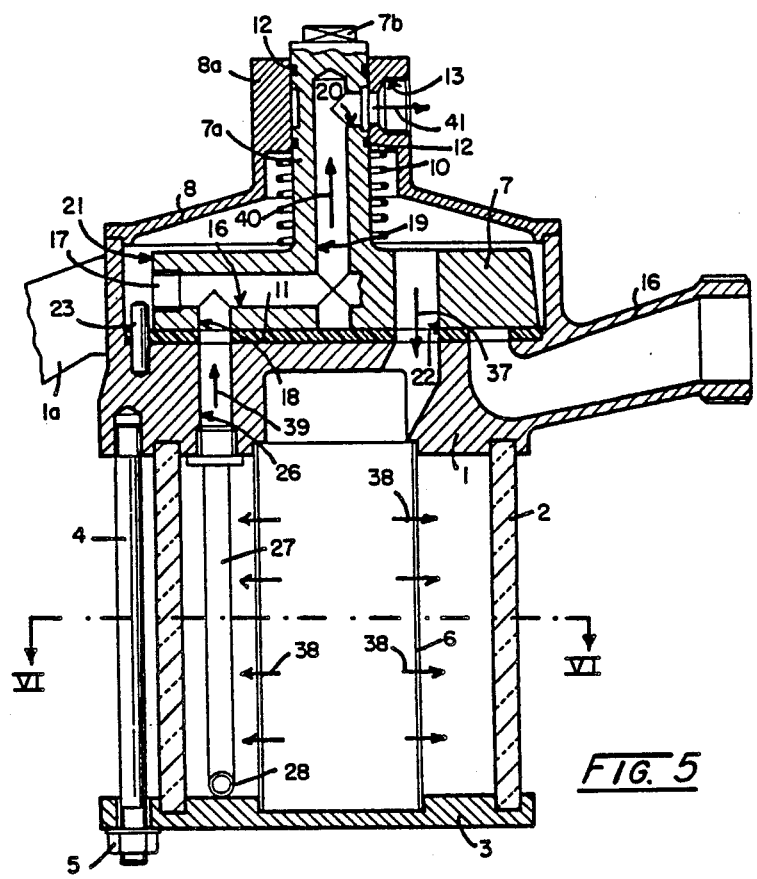
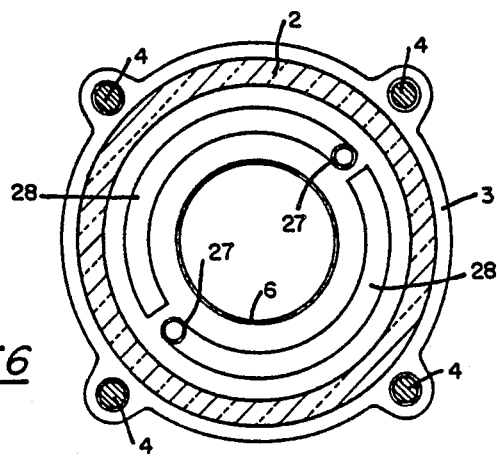

FILTRATION APPARATUS

FIELD OF THE INVENTION

The present invention has as its subject a filtration apparatus comprising a vessel divided into two chambers by a filter, into which vessel opens an inlet orifice for liquid to be filtered and which has an outlet orifice for filtered liquid.

BACKGROUND TO THE INVENTION

One of the problems of filtration apparatus resides in the fact on the one hand of periodically eliminating impurities which remain in suspension in the chamber of the apparatus situated upstream of the filter, or where they are deposited on the floor of this chamber, on the other hand, likewise periodically, to carry out degumming of the filter, that is to say removing the impurities that stick to it.

It has been proposed to carry out this double operation by passing a fluid in counter-current in the apparatus. However, the means for achieving this are generally located outside the filter, are unwieldy, not very well designed and not very effective.

The object of the present invention is to provide a filtration apparatus in which the rinsing of the upstream chamber of the apparatus and the degumming can be carried out with the aid of means completely integral with the apparatus, which can be made particularly compact, simple to use, reliable, effective and elegant in appearance.

BRIEF DISCLOSURE OF THE INVENTION

The invention comprises filtration apparatus comprising a vessel divided into two chambers by a filter, into which vessel opens an inlet orifice for liquid to be filtered and from which opens an outlet orifice for filtered liquid, characterised in that the said vessel contains a moving distributor device, actuable from externally of the said vessel, adapted to take up two working positions, namely a filtration position, in which it allows the liquid to be filtered into the first chamber, which the liquid leaves by passing through the filter, to penetrate into the second chamber, which it leaves, in the filtered condition, through the outlet orifice, and a rinsing position in which it allows liquid into the apparatus directly into the said second chamber, the liquid passing through the filter in the reverse direction to penetrate into the first chamber which it leaves charged with the impurities to be eliminated by an escape orifice located for that purpose in the vessel.

BRIEF DESCRIPTION OF THE DRAWINGS

The drawings represent, by way of example, one embodiment of the subject of the invention.

FIG. 5 is an axial section of this apparatus in the same operative position as in FIG. 3, along the line V—V of FIG. 4, and FIG. 6 is a cross section, on the line VI—VI of FIG. 5.

Figure 1:
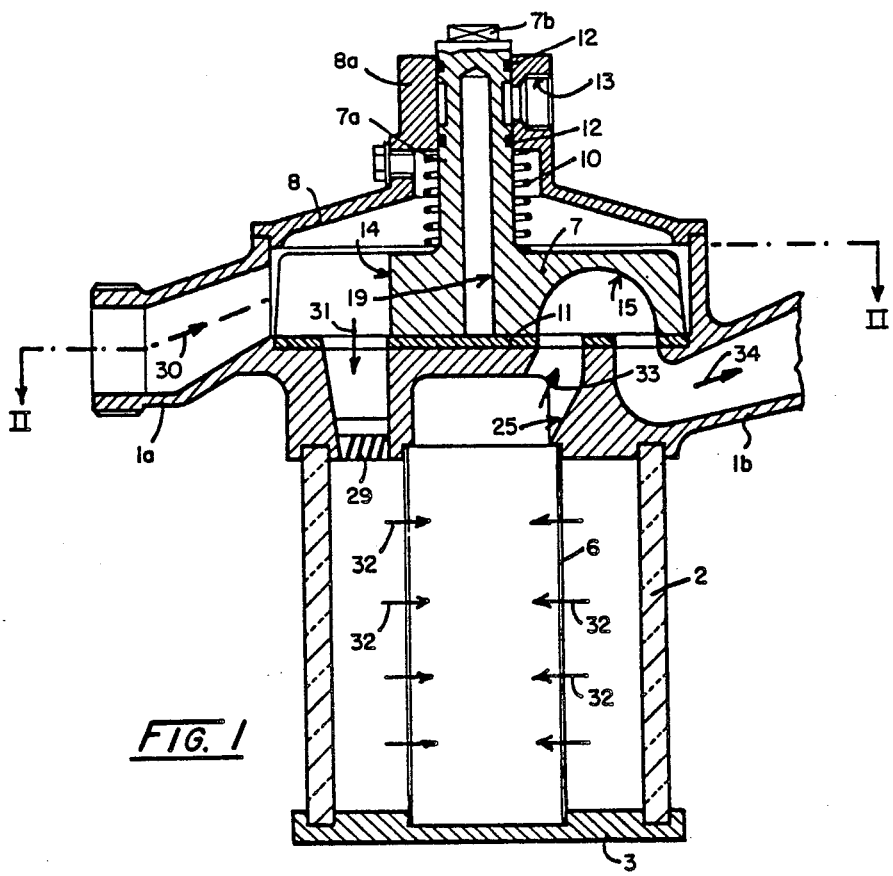
FIG. 1 is an axial section through a filtration apparatus, for example a water filter, in one operative position, along the line I—I of FIG. 2.

The illustrated apparatus comprises a vessel formed in three parts, namely a top element 1, a cylindrical wall 2 and a base 3, assembled with the aid of four tie-rods formed as bolts 4 captive in the element 1 and which are provided with nuts 5. The side wall 2 is of plastic but it could be made of glass or metal, according to the nature of the liquid to be filtered, here water. A cylindrical filter cartridge 6 housed inside the wall 2, coaxially therewith, extends axially between the top element 1 and the base 3. The top element 1 is formed in one piece with two pipe connections 1a and 1b serving as inlet and outlet respectively for liquid.

The top element 1 contains a distributor device 7 in the form of a disc, coaxial with the apparatus, which has a part cylindrical extension 7a which extends through a cover 8 fixed to the element 1 by eight screws 9. A coil spring 10 interposed between the cover 8 and the disc 7 presses the latter against a plane land of the element 1 with the interposition of a sealing gasket 11, of Teflon (Registered Trade Mark) for example. The extremity 7b of the cylindrical part 7a is of square section so that it can turn, with the aid of a hand wheel, not shown, the distributor device 7. The seal between the cylindrical part 7a and a collet 8a which aligns the cover 8 is assured by a toroidal sealing gasket 12. The collet 8a has a radial through passage 13 having a purpose to be explained more fully below.

The distributor device 7 has different bores, passages or throughways intended for the passage of water, as has the top element 1. Thus the disc 7 has an indentation 14 of trapezoidal form, open at its periphery, a relieved part in the form of an arc of a circle 15 opening on its posterior face, a diametral passage 16, closed at its extremities by threaded plugs 17, two longitudinal passages 18 both opening into the passage 16, a longitudinal passage 19 housed in the cylindrical part 7a, a radial passage 20 opening into the passage 19, a peripherally arcuately relieved part 21 and a longitudinal passage 22. The relieved part 21 serves at the same time for the passage of liquid and to limit the movement of the distributor device, being traversed by a pin 23 which is carried in the top element 1 of the vessel of the apparatus. This pin, among other things, stops the sealing gasket 11 being rotated at the same time as the distributor device 7.

Top element one has a longitudinal through-passage 24 of rectangular section, opening into the annular space between the cylindrical wall 2 and the filter cartridge 6, an oblique passage 25 opening into the space within the filter 6 and two longitudinal throughways 26 situated at the same distance from the center as the passages 18 of the distributor 7. Two immersed tubes 27 are threaded at one of their extremities into the throughways 26 and they each terminate in an arcuate tube 28 which extends a little less than 180°, situated in a plane perpendicular to the axis of the apparatus, against the wall of the base 3 thereof (FIG. 6). These tubes 28 have V shaped openings towards the base 3, not shown in the drawing. The passage 24 of the top element 1 is provided with a vane 29 which serves to impart a helical rotation to liquid passing it.

Figure 2:
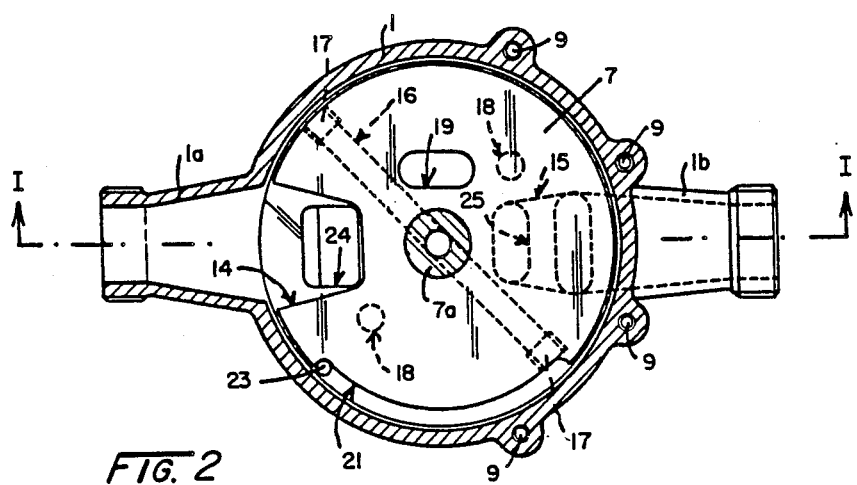
FIG. 2 is a cross section of this apparatus along the broken line II—II of FIG. 1.

As to the gasket therefore 11, it is penetrated by openings necessary to put it in communication with the different passages housed in the distributor 7 and the top element 1 in a manner which permits the apparatus to operate as described below:

When the distributor device 7 occupies the position shown in FIGS. 1 and 2, namely the filtration position, the indentation 14 in the distributor is aligned with the passage 24 of the element 1, while the arcuate relieved part 15 of the distributor is aligned at this time with the passage 25 of the element 1 and the end of the tube connection 1b. In this position of the distributor device 7, the liquid to be filtered enters the top element 1 by the inlet tube connection 1a (arrow 30) then, traverses the relieved section 14 of the distributor 7, flowing through the passage 24 of the element 1 (arrow 31) passes the vane 29 which imparts to it a turbulent motion, crosses the cylindrical filter 6 (arrows 32), where it is filtered, exits the interior of the filter by the passage 25 of the top element 1 (arrow 33), and passes by the angled relieved section 15 of the distributor 7 to pass into the outlet pipe connection 1b by which it leaves the apparatus (arrow 34).

Figure 3:
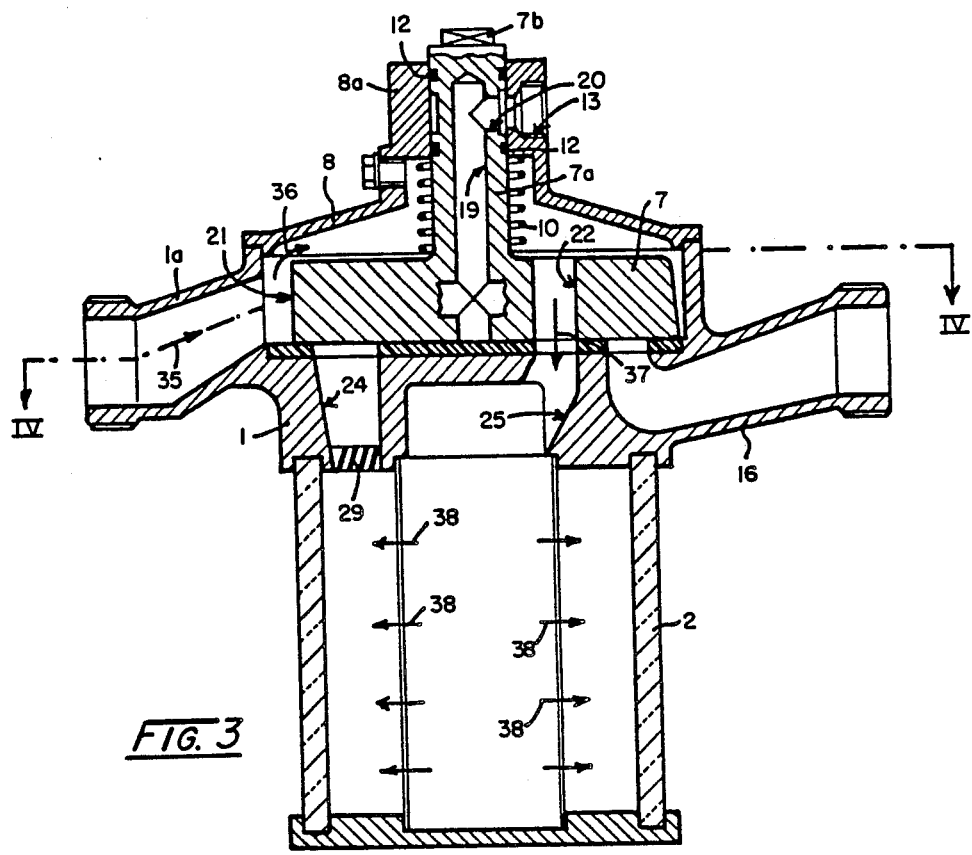
FIG. 3 is an axial section of this apparatus in another operative position, along the line III—III of FIG. 4.
Figure 4:
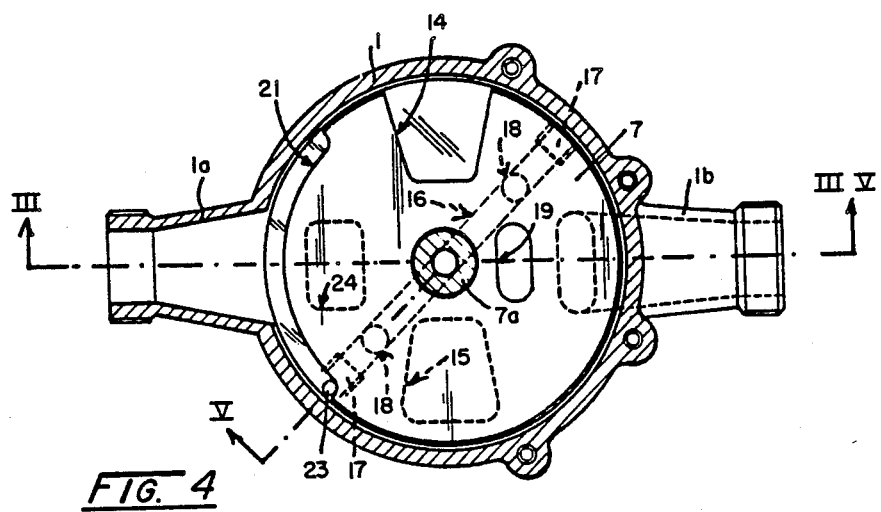
FIG. 4 is a cross section of this apparatus, along the broken line IV—IV of FIG. 3.

When, leaving the filtration position, the distributor device 7 is turned 90° clockwise, to occupy the so-called rinsing and degumming position shown in FIGS. 3, 4 and 5, in which it is at the other extremity of the arcuate relieved section 21 which is then against the abutment 23, the liquid flows into the apparatus via the inlet tube connector 1a (arrow 35), passes by way of the relieved section 21 to flow through the cover 8 (arrow 36), then flows through the axial passage 22 of the distributor 7 (arrow 37) to pass into the interior of the filter 6 which it then passes through in counter-current (arrow 38), degumming the filter. The impurities detach from the filter, then they are held in suspension in the liquid around the same or again they are deposited on the base of the chamber upstream in the apparatus, and are evacuated at the same time as the liquid by the arcuate tubes 28, in which they pass through the openings housed in the latter, then are evacuated by the two immersed tubes 27, by the bores 26 housed in the top element 1 (arrow 39), by the bores 18 of the distributor 7, by the radial bores 16, then by the axial bore 19 (arrow 40) and by the radial bore 20, then by the escape passage 13 housed in the cover 8 (arrow 41).

The filter 6 is thus degummed and the whole apparatus rinsed of the impurities that it contained.

In order that, during this degumming and rinsing operation, any unfiltered liquid does not escape by the outlet tube connector 1b, the entrance to this latter is at this time closed by the disc 7 (FIG. 3).

It is to be noted that if the apparatus is used for filtering water heavily charged with impurities, one could with advantage use two apparatus in order to avoid, during rinsing carried out with such charged water, the impurities accumulating against the filter and then being carried into the outlet tube connector, while the filter is out of action. In this case, the two filters should be mounted so that they can work in parallel during filtration or in series during rinsing with the same water, that is, for the downstream apparatus, the upstream apparatus serves as a filter pre-filtering the water used to rinse the other filter.

A multi-position valve allows the different functions, i.e. filtration with the two filters mounted in parallel, rinsing of one of them with water pre-rinsed by the other, and inversely.

One could imagine that one and the same apparatus contains two filter cartridges and the means for directing the liquid to be filtered permitting the above-mentioned functions.

The present apparatus is very simple, it is compact, elegant in appearance, and reliable. In effect, by virtue of the fact that the distributor device 7 is pressed axially against the sealing gasket 11 by the spring 10, which takes up the effect over time of wear and tear of the sealing gasket, there is no leakage even after prolonged use.

In the example illustrated, the apparatus is intended to be placed in a horizontal conduit, with its axis vertical.

One could equally well, without involving major modification to the apparatus, mount it in a vertical conduit with its axis horizontal. In this case, one of the two immersed tubes 27 will be removed, the one which is retained being placed horizontally in the vertical plane passing through the axis of the apparatus in the part below the same. The tube 28 which, in the example illustrated, extends the tube 27, will be removed and the access openings housed in the tube 27 likewise.

The present apparatus could be provided with a rotary filter cartridge, which could advantageously improve the effectiveness of the filtration, by throwing off and eliminating, by centrifugal force, the impurities which tend to accumulate on the filter and, in consequence, degumming it.

We claim:

1. Filtration apparatus comprising a vessel, a filter which divides said vessel into two chambers, an inlet in said vessel for admitting liquid to be filtered, an outlet in said vessel for exhausting filtered liquid, a movable distributor device in said vessel actuable from externally of said vessel and movable between a filtration position in which it directs the liquid to be filtered into the first chamber which the liquid leaves by passing through the filter to pass into the second chamber which it leaves in the filtered condition through the outlet and a rinsing position in which it directs entering liquid into the said second chamber which the liquid leaves by passing through the filter in the reverse direction to the first chamber which it leaves charged with the impurities to be eliminated by an escape passage located in the vessel, wherein said distributor device includes passage means for interconnecting said escape passage and the first chamber when the distributor device is in the rinsing position, said distributor device disconnects said escape passage and said first chamber when the distributor device is in said filtration position, a cover for said vessel, a generally cylindrical wall, wherein said filter has a cylindrical shape and is mounted in said vessel coaxially with said wall, wherein said distributor device has a generally disc like shape, lies coaxial with the said vessel and is rotatably mounted in said vessel, said disc has a cylindrical extension which passes through an opening defined in the closure cover of said vessel and wherein the extremity of said cylindrical extension has section means for enabling it to be turned to actuate the distributor device, and a fixed vane situated in the passage between the inlet and the said first chamber for imparting a helical motion to the liquid engaging it.

* * * * *